United States Patent
Denney et al.

(10) Patent No.: US 12,315,176 B2
(45) Date of Patent: May 27, 2025

(54) DEVICES, SYSTEMS, AND METHODS FOR ANOMALY DETECTION

(71) Applicant: Canon Virginia, Inc., Newport News, VA (US)

(72) Inventors: Bradley Scott Denney, Irvine, CA (US); Nikhil Krishnan, Bangalore (IN)

(73) Assignee: Canon Virginia, Inc., Newport News, VA (US)

( * ) Notice: Subject to any disclaimer, the term of this patent is extended or adjusted under 35 U.S.C. 154(b) by 495 days.

(21) Appl. No.: 17/720,195

(22) Filed: Apr. 13, 2022

(65) Prior Publication Data

US 2022/0335631 A1   Oct. 20, 2022

Related U.S. Application Data

(60) Provisional application No. 63/174,947, filed on Apr. 14, 2021.

(51) Int. Cl.
*G06T 7/33* (2017.01)
*G06T 7/00* (2017.01)

(52) U.S. Cl.
CPC ............ *G06T 7/337* (2017.01); *G06T 7/0002* (2013.01); *G06T 2207/20224* (2013.01)

(58) Field of Classification Search
CPC ................... G06T 7/337; G06T 7/0002; G06T 2207/20224; G06T 2207/20081; G06T 7/0004
See application file for complete search history.

(56) References Cited

U.S. PATENT DOCUMENTS

| | | | |
|---|---|---|---|
| 6,005,978 A | 12/1999 | Garakani | |
| 6,320,976 B1 | 11/2001 | Murthy | |
| 7,318,005 B1 | 1/2008 | Smaragdis | |
| 7,440,607 B1 | 10/2008 | Lin | |
| 7,715,623 B2 | 5/2010 | Ling | |
| 8,107,717 B2 | 1/2012 | Maeda | |
| 8,131,107 B2 | 3/2012 | Sun | |

(Continued)

FOREIGN PATENT DOCUMENTS

JP      2015-108522 A      6/2015

OTHER PUBLICATIONS

David W. J. Stein et al., Anomaly Detection from Hyperspectral Imagery, IEEE Signal Processing Magazine, Jan. 2002.

M. Haselmann et al., Pixel-Wise Defect Detection by CNNs without Manually Labeled Training Data, Applied Artificial Intelligence, Mar. 2019.

(Continued)

*Primary Examiner* — Emily C Terrell
*Assistant Examiner* — Julia Z. Yao
(74) *Attorney, Agent, or Firm* — Canon U.S.A., Inc. IP Division

(57) ABSTRACT

Some devices, systems, and methods obtain training images; select a first reference image and a second reference image from the training images; generate a first set of aligned training images, wherein generating the first set of aligned training images includes aligning the training images to the first reference image; generate a first anomaly-detection model based on the first set of aligned training images; generate a second set of aligned training images, wherein generating the second set of aligned training images includes aligning the training images to the second reference image; and generate a second anomaly-detection model based on the second set of aligned training images.

20 Claims, 15 Drawing Sheets

(56) References Cited

U.S. PATENT DOCUMENTS

| | | |
|---|---|---|
| 8,238,635 B2 | 8/2012 | Can |
| 8,345,949 B2 | 1/2013 | Zhao |
| 8,442,301 B2 | 5/2013 | Dragovich |
| 8,867,787 B2 | 10/2014 | Singamsetti |
| 9,170,543 B2 | 10/2015 | Arakawa |
| 9,256,920 B1 | 2/2016 | Choudhury |
| 9,378,552 B2 | 6/2016 | Sato |
| 9,400,256 B2 | 7/2016 | Henderkott |
| 9,405,991 B2 | 8/2016 | Sharma |
| 9,460,490 B2 | 10/2016 | Choudhury |
| 9,619,755 B2 | 4/2017 | Wang |
| 10,410,084 B2 | 9/2019 | Huang |
| 10,789,697 B2 | 9/2020 | Krishnan |
| 10,997,462 B2 | 5/2021 | Krishnan |
| 10,997,712 B2 | 5/2021 | Cao |
| 2002/0088952 A1* | 7/2002 | Rao ................ G01N 21/9501 250/559.45 |
| 2006/0245635 A1 | 11/2006 | Ishikawa |
| 2008/0101686 A1* | 5/2008 | Sali ................ G01N 21/95607 382/149 |
| 2009/0238432 A1 | 9/2009 | Can |
| 2009/0279772 A1 | 11/2009 | Sun |
| 2013/0148987 A1 | 6/2013 | Arakawa |
| 2014/0270489 A1 | 9/2014 | Lim |
| 2014/0348415 A1 | 11/2014 | Bhattad |
| 2015/0227809 A1 | 8/2015 | Alpert |
| 2017/0140516 A1 | 3/2017 | Maher |
| 2018/0114092 A1* | 4/2018 | Huang ................ G06V 10/98 |
| 2019/0066291 A1* | 2/2019 | Martin ............ G01N 21/95607 |
| 2019/0220965 A1* | 7/2019 | Cao ................ G06T 7/337 |
| 2019/0285980 A1 | 9/2019 | Yoshikawa |
| 2019/0311224 A1* | 10/2019 | Krishnan ............ G06V 10/763 |
| 2020/0151496 A1 | 5/2020 | Cao |
| 2021/0133989 A1* | 5/2021 | Bhattacharyya ...... G06V 10/82 |
| 2021/0209418 A1* | 7/2021 | Badanes ............ G06V 10/454 |
| 2022/0036525 A1* | 2/2022 | Xin ................ G06V 10/772 |
| 2022/0222803 A1* | 7/2022 | Lin ................ G06T 7/337 |

OTHER PUBLICATIONS

Rene Heideklang et al., Application of Data Fusion in Nondestructive Testing (NDT), Jul. 2013.
Xavier Gros et al., Pixel Level NDT Data Fusion, Jul. 1999.
J. Hassan et al., Welding Defect Detection and Classification Using Geometric Features, Dec. 2012.
Nick Kingsbury, Complex Wavelets for Shift Invariant Analysis and Filtering of Signals, May 2001.
Roumen Kountchev et al., Defects detection in X-ray images and photos, Feb. 2011.
V Lashkia, Defect detection in X-ray images using fuzzy reasoning, Image and Vision Computing, vol. 19, Issue 5, Apr. 2001, Abstract.
Shekhar B. Sastry, Computationally Efficient Methods for Shift-variant Image Restoration in Two and Three Dimensions, Sep. 2011.
Ian T. Young et al., Fundamentals of Image Processing, Jul. 2004.
Tian Yuan et al., Automatic Defect Detection in X-Ray Images Using Image Data Fusion, Dec. 2006.
Caixia Zheng et al., An improved method for object detection in astronomical images, Jun. 2015.
Richard Szeliski, Computer Vision: Algorithms and Applications, pp. i-73, Sep. 2010.
Richard Szeliski, Computer Vision: Algorithms and Applications, pp. 73-174, Sep. 2010.
Richard Szeliski, Computer Vision: Algorithms and Applications, pp. 174-266, Sep. 2010.
Richard Szeliski, Computer Vision: Algorithms and Applications, pp. 267-363, Sep. 2010.
Richard Szeliski, Computer Vision: Algorithms and Applications, pp. 363-466, Sep. 2010.
Richard Szeliski, Computer Vision: Algorithms and Applications, pp. 467-575, Sep. 2010.
Richard Szeliski, Computer Vision: Algorithms and Applications, pp. 577-679, Sep. 2010.
Richard Szeliski, Computer Vision: Algorithms and Applications, pp. 679-776, Sep. 2010.
Richard Szeliski, Computer Vision: Algorithms and Applications, pp. 777-789 and 933-957, Sep. 2010.

* cited by examiner

DEVICES, SYSTEMS, AND METHODS FOR ANOMALY DETECTION

CROSS-REFERENCE TO RELATED APPLICATIONS

This application claims the benefit of U.S. Provisional Application No. 63/174,947, which was filed on Apr. 14, 2021.

BACKGROUND

Technical Field

This application generally concerns the detection of anomalies in images, such as the nondestructive detection of anomalies in an object using an image of the object.

Background

Nondestructive testing techniques are used to examine the properties of objects without causing damage to the objects. These techniques can be used in a quality-control process to identify defects in the object.

SUMMARY

Some embodiments of a device comprise one or more computer-readable storage media and one or more processors in communication with the one or more computer-readable storage media. The one or more computer-readable storage media and the one or more processors are configured to cause the device to perform operations that comprise obtaining training images; selecting a first reference image and a second reference image from the training images; generating a first set of aligned training images, wherein generating the first set of aligned training images includes aligning the training images to the first reference image; generating a first anomaly-detection model based on the first set of aligned training images; generating a second set of aligned training images, wherein generating the second set of aligned training images includes aligning the training images to the second reference image; and generating a second anomaly-detection model based on the second set of aligned training images.

And, in some embodiments, the operations further comprise obtaining a test image that is defined in a test image space; aligning the test image to the first reference image, thereby generating a first aligned test image; generating a first error map based on the first aligned test image and on the first anomaly-detection model; aligning the first error map to the test image space, thereby generating a first aligned error map; aligning the test image to the second reference image, thereby generating a second aligned test image; generating a second error map based on the second aligned test image and on the second anomaly-detection model; aligning the second error map to the test image space, thereby generating a second aligned error map; and generating a composite error map based on the first aligned error map and on the second aligned error map.

Some embodiments of a method comprise obtaining training images; selecting a first reference image and a second reference image from the training images; generating a first set of aligned training images, wherein generating the first set of aligned training images includes aligning the training images to the first reference image; generating a first anomaly-detection model based on the first set of aligned training images; generating a second set of aligned training images, wherein generating the second set of aligned training images includes aligning the training images to the second reference image; and generating a second anomaly-detection model based on the second set of aligned training images.

Some embodiments of one or more computer-readable storage media store instructions that, when executed by one or more computing devices, cause the one or more computing devices to perform operations that comprise obtaining training images; selecting a first reference image and a second reference image from the training images; generating a first set of aligned training images, wherein generating the first set of aligned training images includes aligning the training images to the first reference image; generating a first anomaly-detection model based on the first set of aligned training images; generating a second set of aligned training images, wherein generating the second set of aligned training images includes aligning the training images to the second reference image; and generating a second anomaly-detection model based on the second set of aligned training images.

DESCRIPTION

The following paragraphs describe certain explanatory embodiments. Other embodiments may include alternatives, equivalents, and modifications. Additionally, the explanatory embodiments may include several features, and a particular feature may not be essential to some embodiments of the devices, systems, and methods that are described herein.

Also, as used herein, the conjunction "or" generally refers to an inclusive "or," although "or" may refer to an exclusive "or" if expressly indicated or if the context indicates that the "or" must be an exclusive "or." Furthermore, as used herein, the terms "first," "second," and so on, do not necessarily denote any ordinal, sequential, or priority relation, but are used to distinguish one member, operation, element, or set from another, unless specified otherwise.

Figure 1:
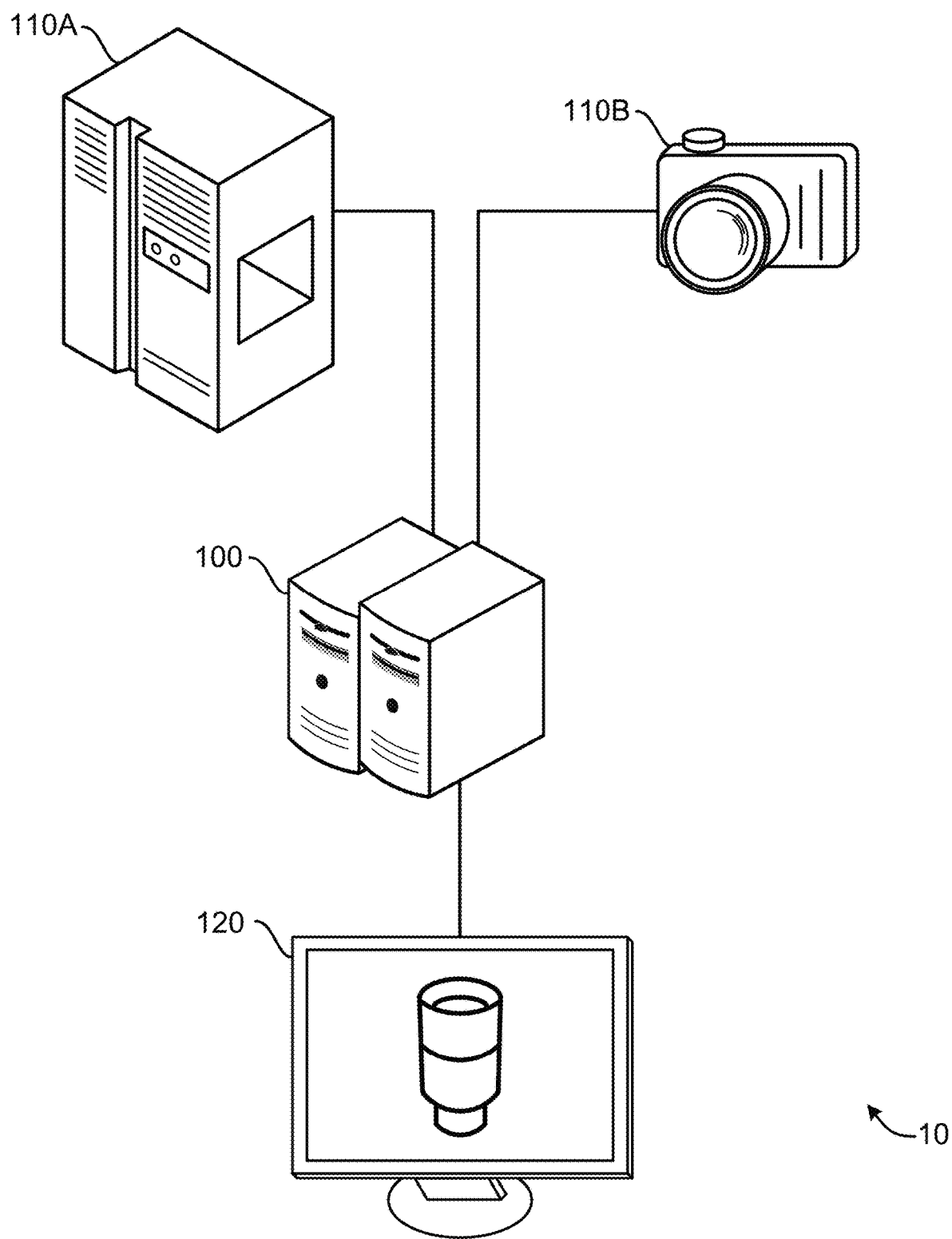
FIG. 1 illustrates an example embodiment of an anomaly-detection system.

FIG. 1 illustrates an example embodiment of an anomaly-detection system. The anomaly-detection system 10 includes one or more anomaly-detection devices 100, which are specially-configured computing devices (e.g., specially-configured computer-vision devices); one or more image-capturing devices, such as an x-ray device 110A or a camera 110B; and at least one display device 120.

The one or more anomaly-detection devices 100 are configured to detect anomalies in input images (e.g., x-ray images) based on the input images and on one or more training images. An anomaly in an image of an object may indicate a defect in the object in the location of the anomaly.

Figure 2:
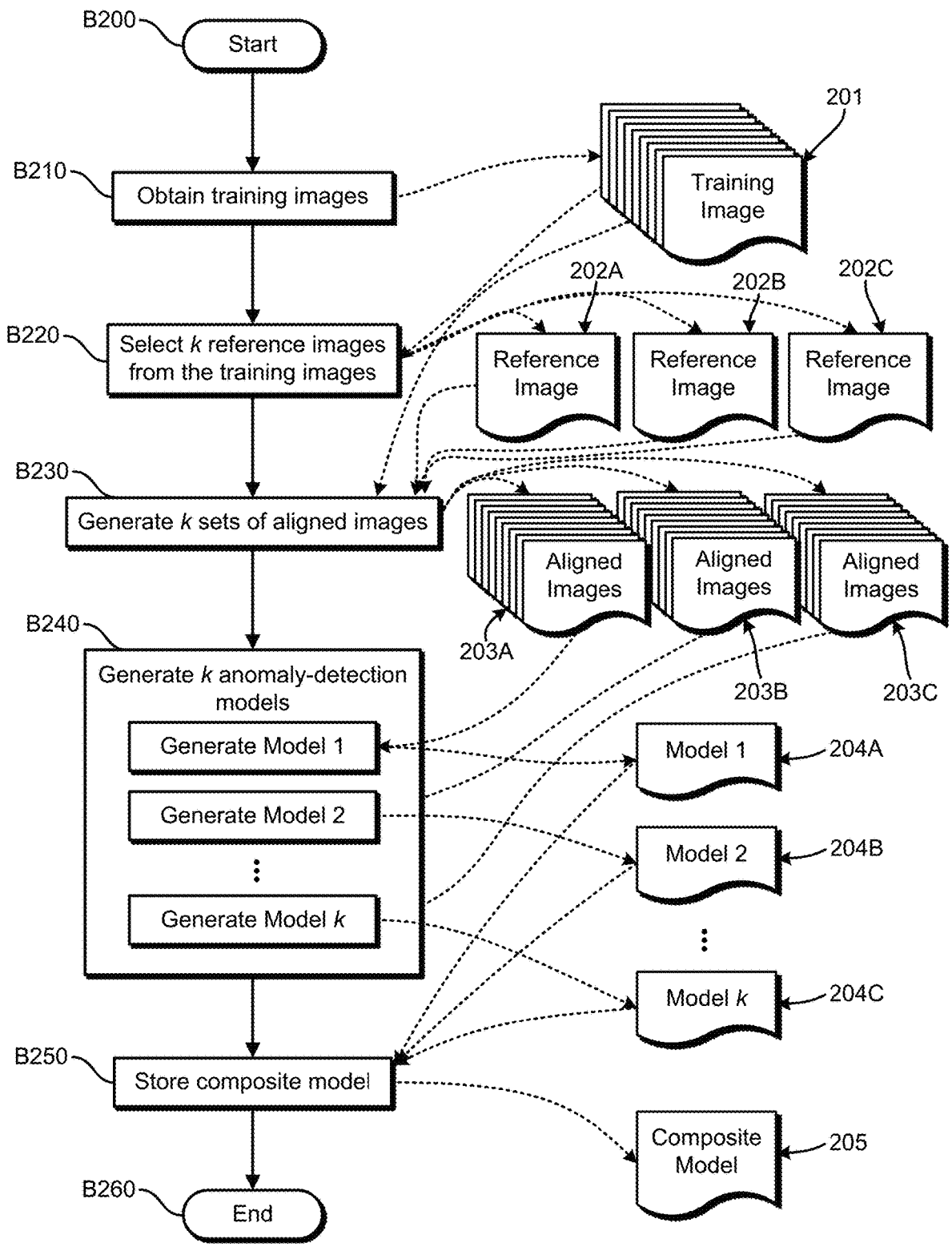
FIG. 2 illustrates an example embodiment of an operational flow for generating anomaly-detection models.

FIG. 2 illustrates an example embodiment of an operational flow for generating anomaly-detection models. Although this operational flow and the other operational flows that are described herein are each presented in a certain respective order, some embodiments of these operational flows perform at least some of the operations in different orders than the presented orders. Examples of different orders include concurrent, parallel, overlapping, reordered, simultaneous, incremental, and interleaved orders. Also, some embodiments of these operational flows include operations (e.g., blocks) from more than one of the operational flows that are described herein. Thus, some embodiments of the operational flows may omit blocks, add blocks (e.g., include blocks from other operational flows that are described herein), change the order of the blocks, combine blocks, or divide blocks into more blocks relative to the example embodiments of the operational flows that are described herein.

Furthermore, although this operational flow and the other operational flows that are described herein are performed by an anomaly-detection device, some embodiments of these operational flows are performed by two or more anomaly-detection devices or by one or more other specially-configured computing devices.

The operational flow in FIG. 2 starts in block B200 and then moves to block B210, where an anomaly-detection device obtains training images 201. Next, in block B220, the anomaly-detection device selects k reference images 202A-C from the training images 201. The number of reference images (k) can be determined by the anomaly-detection device, by another device, or by a user. Although the embodiment in FIG. 2 shows three reference images, in some embodiments, more than or fewer than three reference images are selected. Also, for example, in some embodiments, the reference images 202A-C are randomly selected, the reference images 202A-C are selected using a machine-learning model, or the reference images 202A-C are selected using clustering (e.g., using a clustering algorithm).

The flow then moves to block B230, where the anomaly-detection device aligns one or more (e.g., all) of the training images to each of the k selected reference images 202A-C, thereby generating k sets of aligned images 203A-C. For example, for a particular reference image, some embodiments of the anomaly-detection device align all of the training images other than the particular reference image to the particular reference image. Also for example, some embodiments of the anomaly-detection device align images as described in U.S. Patent Publication Number 2019/0220965.

Figure 4:
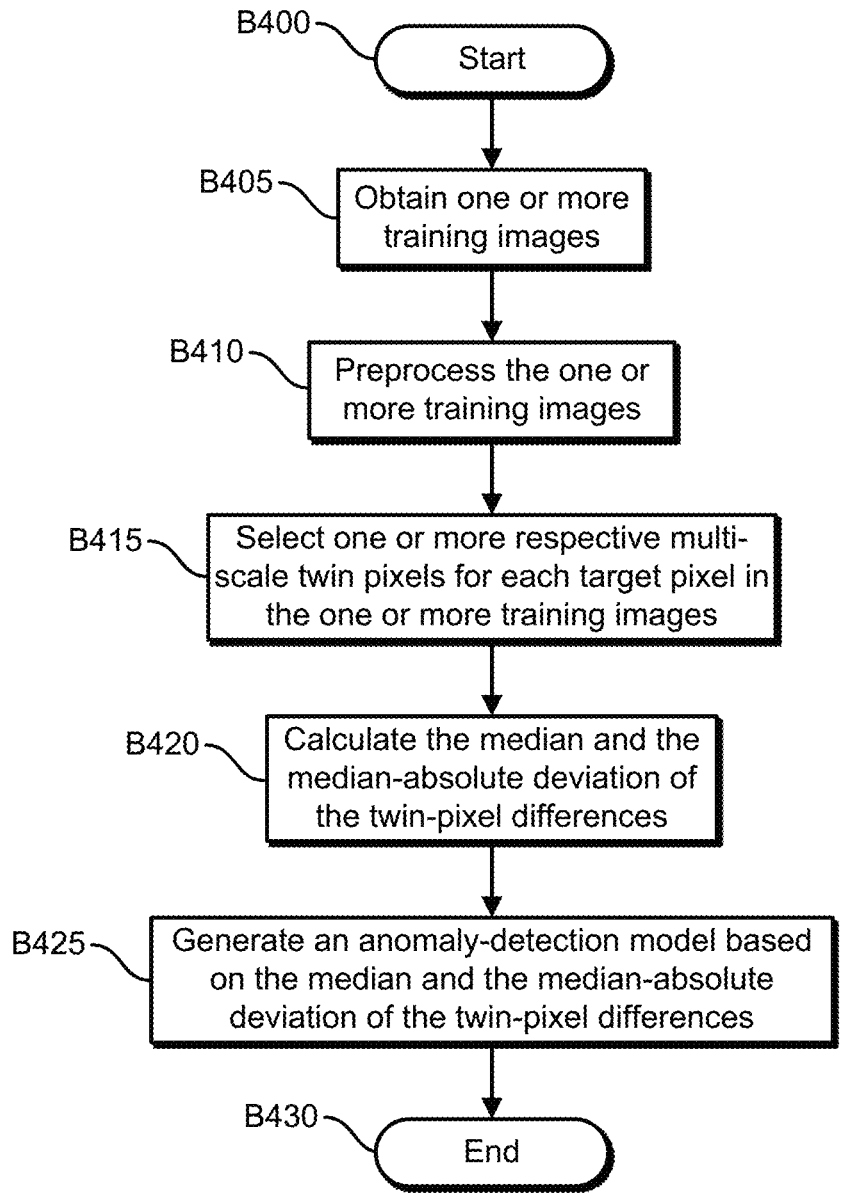
FIG. 4 illustrates an example embodiment of an operational flow for generating an anomaly-detection model.
Figure 11:
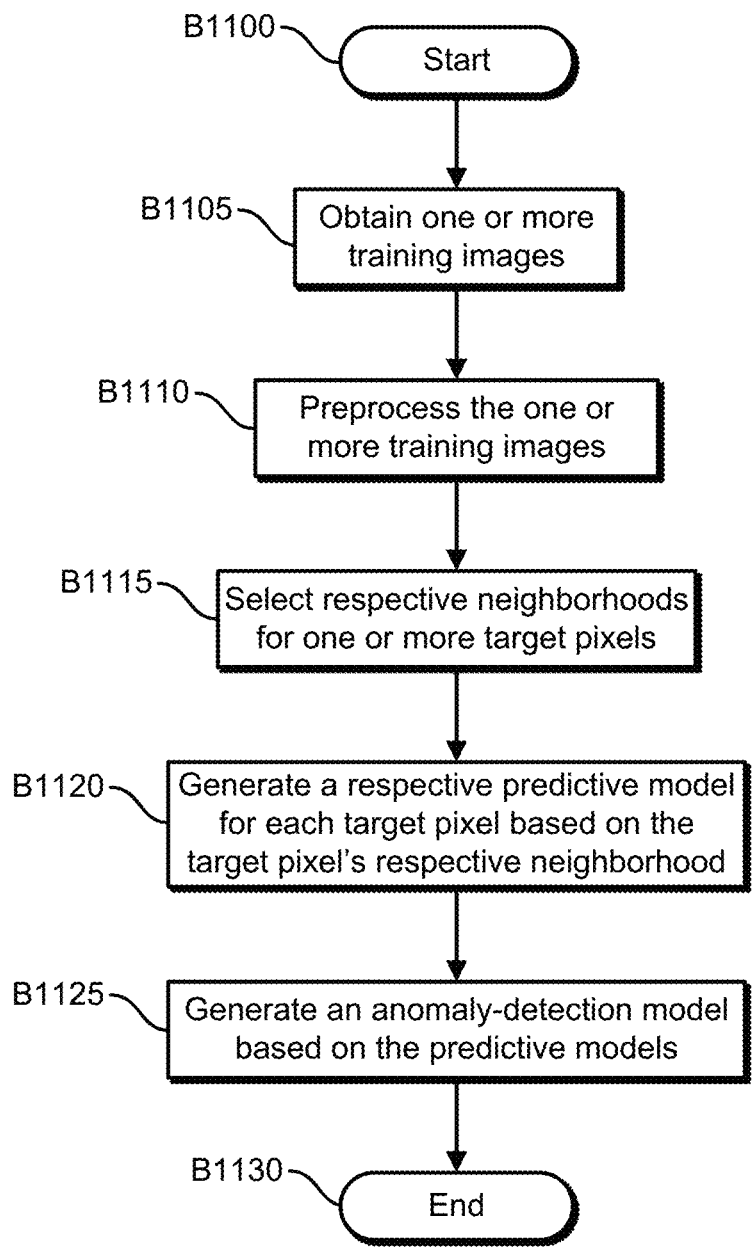
FIG. 11 illustrates an example embodiment of an operational flow for generating an anomaly-detection model.

Then, in block B240, the anomaly-detection device generates k anomaly-detection models 204A-C (e.g., as described in FIG. 4, as described in FIG. 11). Each of the anomaly-detection models 204A-C is generated based on a respective one of the sets of aligned images 203A-C. Also, each anomaly-detection model 204A-C has a corresponding reference image 202A-C. For example, in FIG. 2, reference image 202A is the corresponding reference image of anomaly-detection model 1 204A.

Next, in block B250, the anomaly-detection device stores the k anomaly-detection models 204A-C as a composite anomaly-detection model 205.

Figure 3:
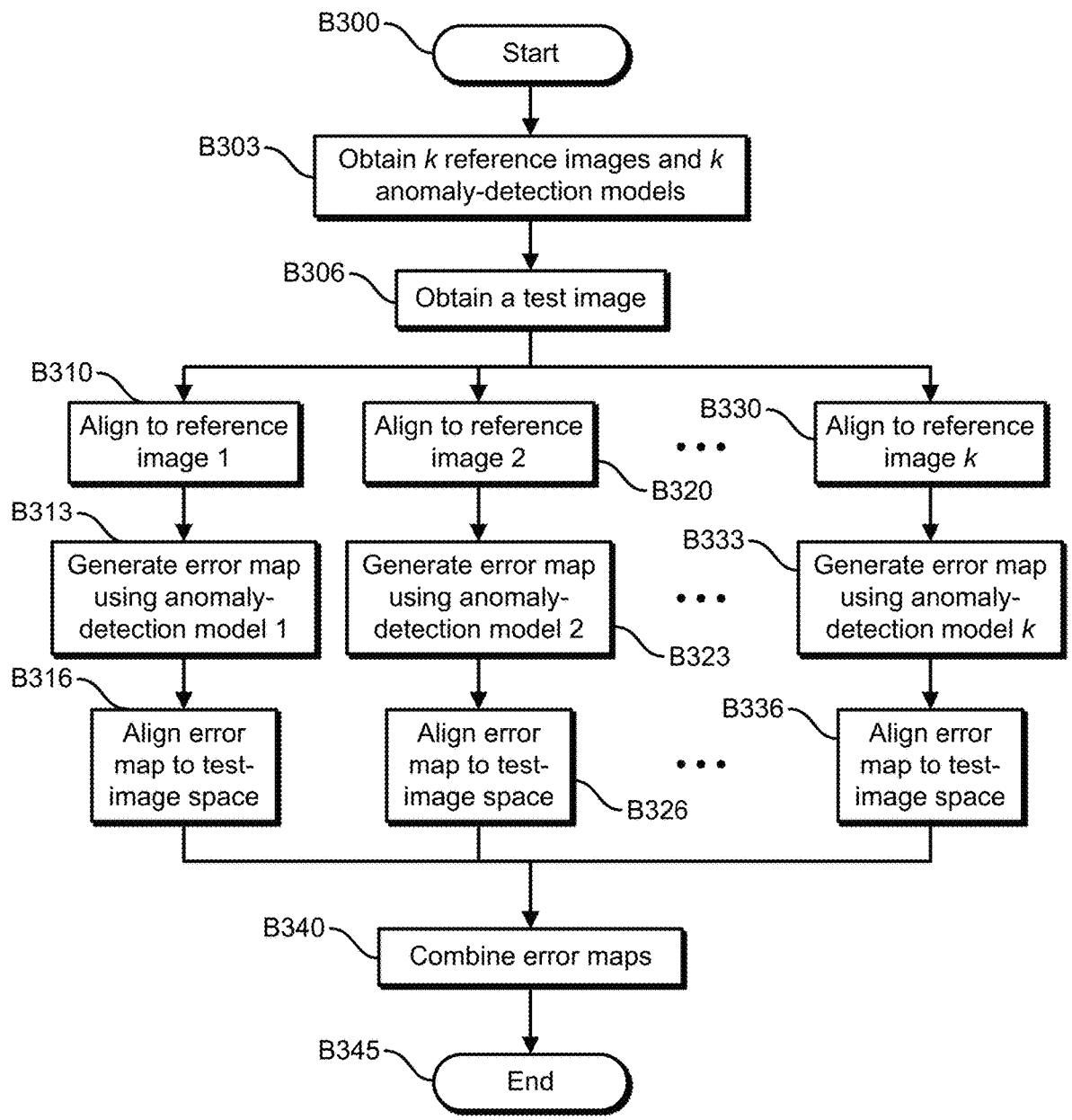
FIG. 3 illustrates an example embodiment of an operational flow for anomaly detection.

FIG. 3 illustrates an example embodiment of an operational flow for anomaly detection. The flow begins in block B300 and then moves to block B303, where an anomaly-detection device obtains k reference images and k anomaly-detection models. Next, in block B306, the anomaly-detection device obtains a test image. The flow then splits into k flows.

The first flow of the k flows proceeds to block B310, where the anomaly-detection device aligns the test image to reference image 1. Next, in block B313, the anomaly-detection device generates an error map using anomaly-detection model 1 and the aligned test image (e.g., as described in FIG. 13, as described in FIG. 14). Then, in block B316, the anomaly-detection device aligns the error map to the test image's space. For example, the anomaly-detection device may warp the error map to the test image's space. In some embodiments, the aligning in block B316 is the opposite or inverse of the aligning that is performed in B310. After the operations in block B316, the error results of each pixel are located at the same position as the pixel's original position in the test image. The first flow then moves to block B340.

The second flow of the k flows proceeds to block B320, where the anomaly-detection device aligns the test image to reference image 2. Next, in block B323, the anomaly-detection device generates an error map using anomaly-detection model 2 and the aligned test image. Then, in block B326, the anomaly-detection device aligns the error map to the test image's space. The second flow then moves to block B340.

The k-th flow of the k flows proceeds to block B330, where the anomaly-detection device aligns the test image to reference image k. Next, in block B333, the anomaly-detection device generates an error map using anomaly-detection model k and the aligned test image. Then, in block B336, the anomaly-detection device aligns the error map to the test image's space. The k-th flow then moves to block B340.

In block B340, the anomaly-detection combines the error maps. In some embodiments, the anomaly-detection results are quantized in m levels to generate various confidence levels for defects. For example, some embodiments divide the error space into m=4 confidence regions using 4 thresholds, $t_1 < t_2 < t_3 < t_4$. Error values less than $t_1$ are categorized as normal with confidence level value 0. Error values between $t_1$ and $t_2$ are categorized as anomalies with confidence level value 1. Error values between $t_2$ and $t_3$ are categorized as anomalies with confidence level value 2. Error values between $t_3$ and $t_4$ are categorized as anomalies with confidence level value 3. Error values above $t_4$ are categorized as anomalies with the highest level, which is confidence level value 4 in this example. The individual confidence value maps can be merged by calculating the average confidence-level value over all the models, applying the quantization again with respect to the same thresholds, $t_1 < t_2 < t_3 < t_4$. To generate a binary anomaly map, the confidence value map can be thresholded with the desired confidence level value.

Also, in some embodiments, the anomaly-detection results from all models are vectorized for each pixel, and a classifier (e.g., a one-class classifier, such as isolation forest) is used on each pixel's vector to detect anomalies.

Thus, some embodiments of the anomaly-detection device can perform a pixel-wise anomaly detection on a test image using multiple anomaly-detection models and based on multiple reference images.

FIG. 4 illustrates an example embodiment of an operational flow for generating an anomaly-detection model. The operational flow starts in block B400 and then proceeds to block B405, where the anomaly-detection device obtains one or more training images (e.g., some images of a defect-free object, some images of an object that includes defects).

Next, in block B410, the anomaly-detection device preprocesses the one or more images. For example, some embodiments of the preprocessing include two operations. The initial preprocessing operation removes (e.g., deletes, cuts out) invalid, unwanted, or irrelevant areas from each training image. The subsequent preprocessing operation generates a mask for the image. For example, the mask may be generated based on intensity thresholding or information about the spatial structure of the object in the image.

Figure 5:
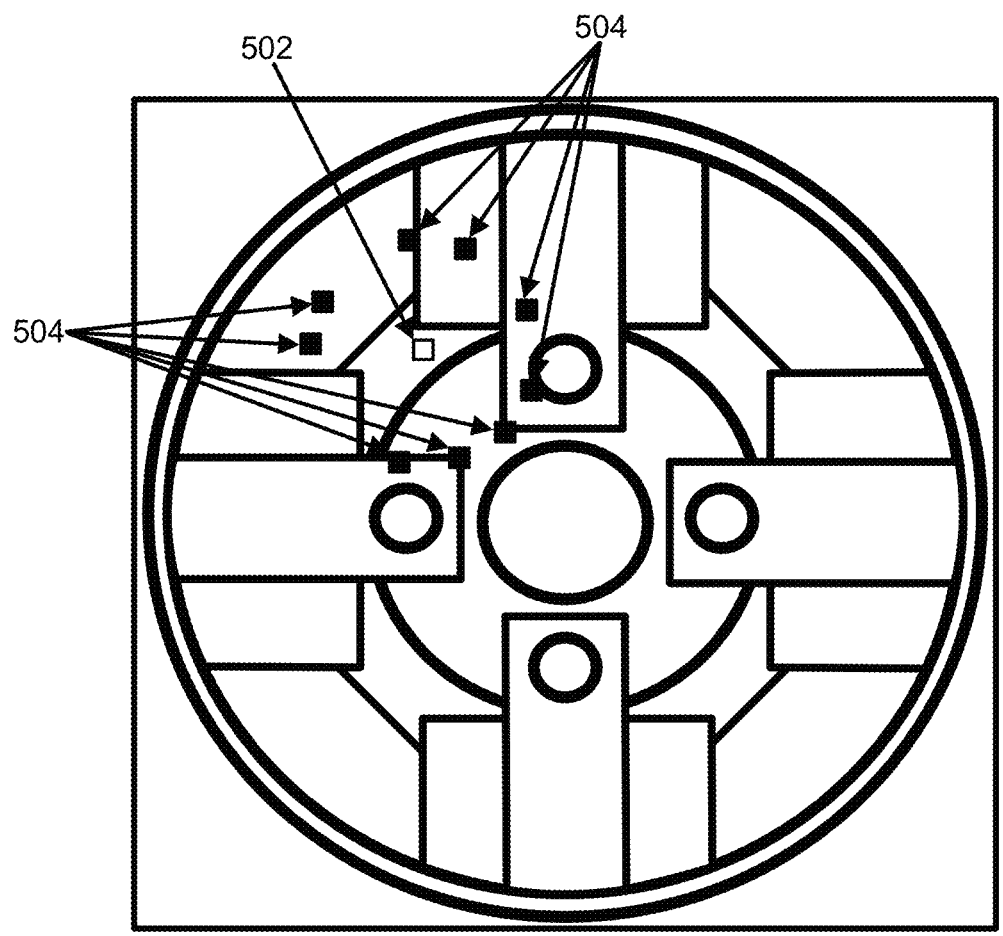
FIG. 5 illustrates an example embodiment of a target pixel and its twin pixels.
Figure 6:
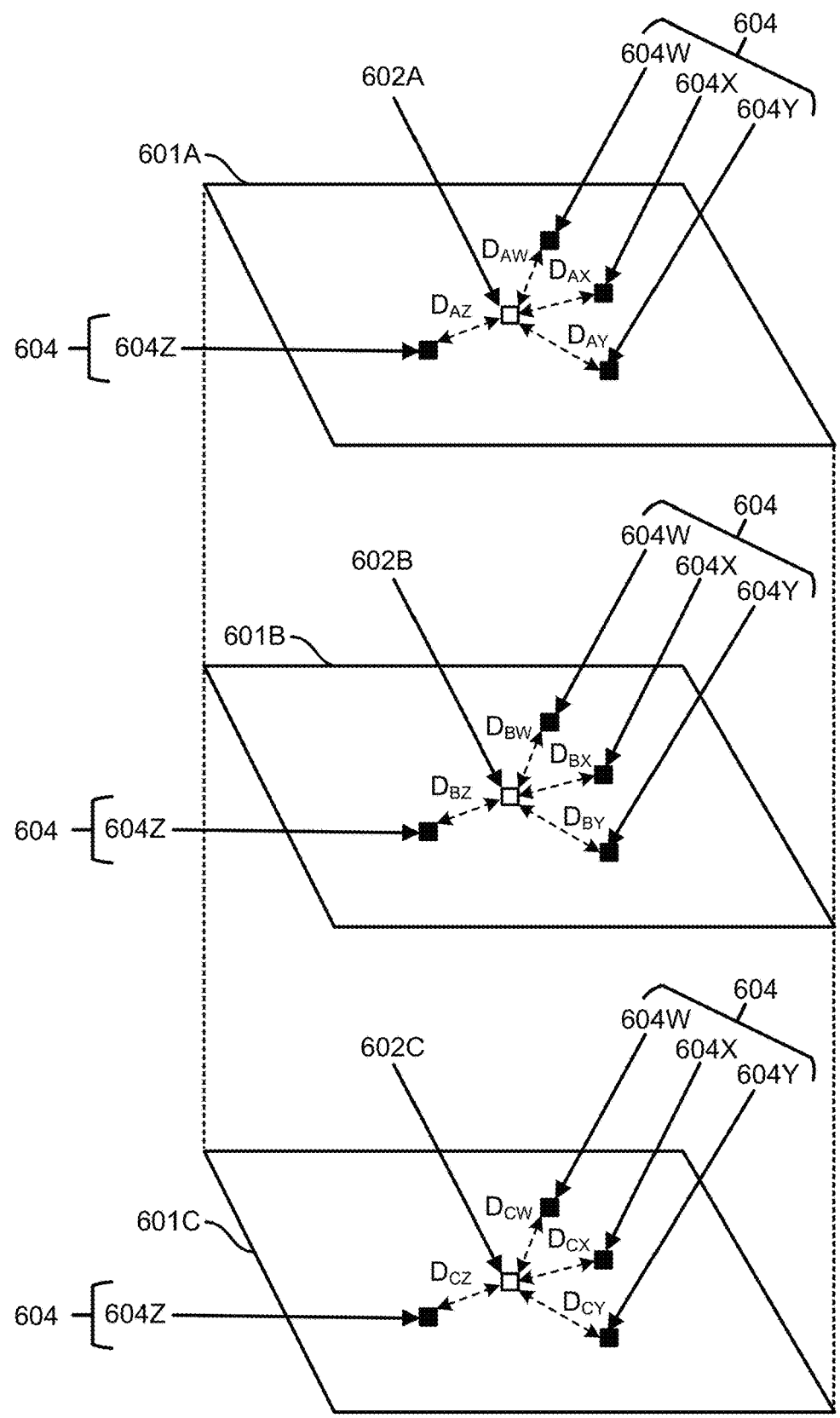
FIG. 6 illustrates an example embodiment of corresponding target pixels and their respective twin pixels.

After block B410, the flow moves to block B415. In block B415, the anomaly-detection device selects one or more respective associated pixels ("twin pixels") for one or more of the pixels in the one or more training images. The respective twin pixels of a pixel are pixels for which the pixel-value differences relative to the pixel are calculated (for example, as illustrated in FIG. 6). In some embodiments, each of a pixel's twin pixels are pixels that are in the neighborhood and in the same image. FIG. 5 illustrates an example embodiment of a pixel 502 and its associated pixels 504 (twin pixels 504). When referring to a pixel for which one or more twin pixels will be or have been selected, the pixel may be referred to herein as a "target pixel." Thus, in FIG. 5, the pixel 502 is a target pixel. A pixel may be both a target pixel and a twin pixel to another target pixel. For example, in FIG. 5, each of the twin pixels 504 may also be a target pixel, and the pixel 502 may be a twin pixel to another target pixel. In some embodiments, each pixel in an image is used as a target pixel. Also, the value of a pixel may represent intensity.

Figure 7:
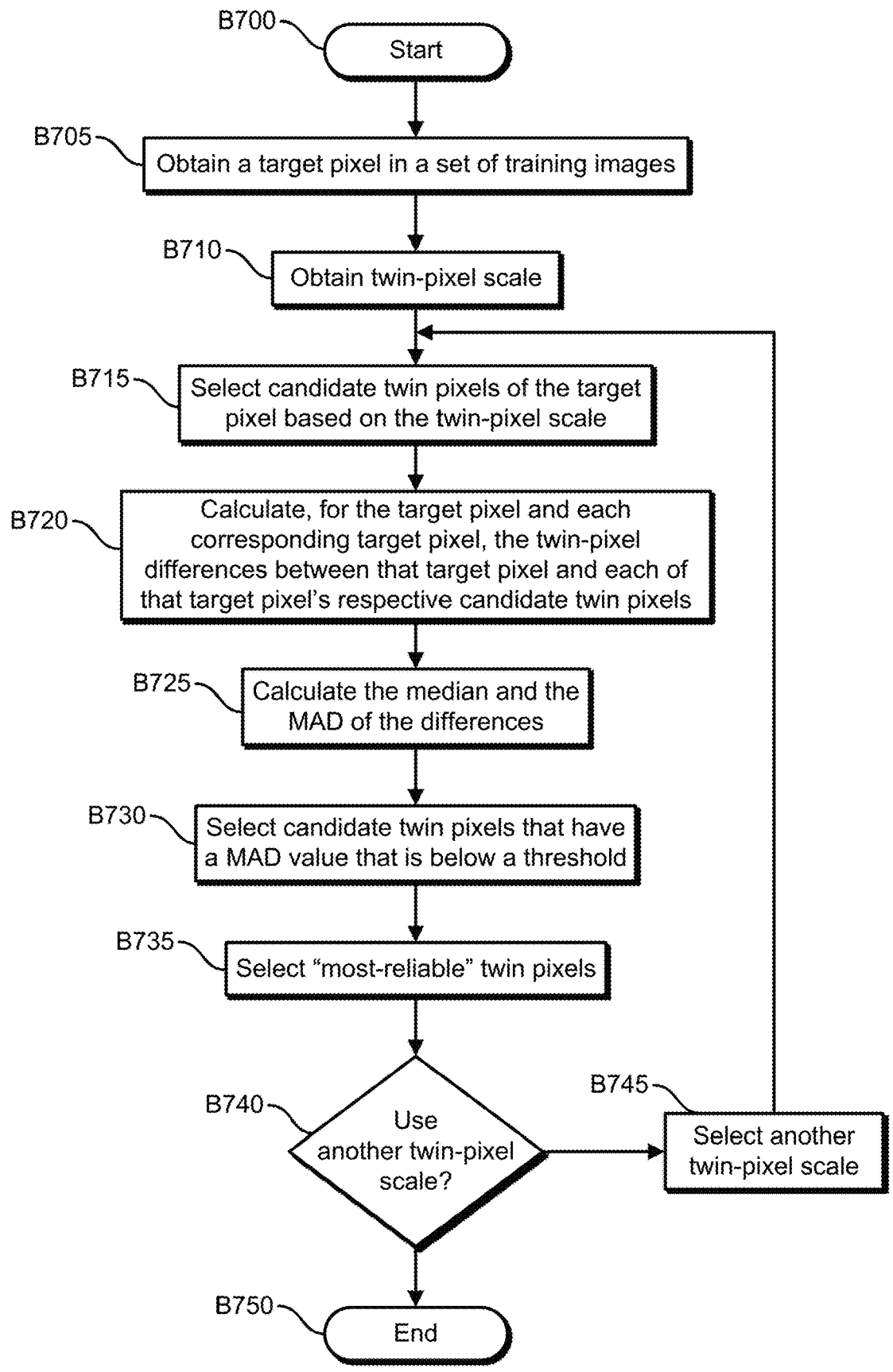
FIG. 7 illustrates an example embodiment of an operational flow for twin-pixel selection.

To select the twin pixels for a target pixel, some embodiments of the anomaly-detection device perform the operational flow that is described in FIG. 7. Also, for example, to select the respective twin pixels for a target pixel, some embodiments of the anomaly-detection device use similarity in value variation or similarity in spatial organization.

Next, in block B420, the anomaly-detection device calculates one or more centrality and variation, such as one or more medians and one or more median-absolute deviations (MADs), of the twin-pixel differences of corresponding target pixels and their twin pixels. Corresponding target pixels are target pixels that have the same or similar positions (e.g., x,y coordinates) in their respective images. Also, the twin pixels of a target pixel may have respective corresponding twin pixels in other images. Corresponding twin pixels are twin pixels that have the same or similar positions (e.g., x,y coordinates) in their respective images or a corresponding relative position from their target pixel across training images.

A twin-pixel difference is a difference between the value of a target pixel and the value of a twin pixel of the target pixel (e.g., between the intensity of a target pixel the intensity of a twin pixel of the target pixel). A median of the twin-pixel differences is the median of multiple twin-pixel differences, for example the twin-pixel differences of corresponding target pixels. A MAD of the twin-pixel differences is the MAD of multiple twin-pixel differences, for example the twin-pixel differences of corresponding target pixels across the training images.

For example, FIG. 6 illustrates an example embodiment of corresponding target pixels and their respective twin pixels. FIG. 6 includes three training images 601A-C, and each training image has a respective one of the corresponding target pixels 602A-C. The corresponding target pixels 602A-C are located in the same position (e.g., x,y coordinates) in the training images 601A-C. If the images are images of instances of the same type of object and are aligned, then each of the corresponding target pixels 602A-C shows the same location on the object.

FIG. 6 also shows the respective twin pixels 604 of each of the target pixels 602A-C. The twin pixels 604 in the first image 601A include four twin pixels 604W-Z, the twin pixels 604 in the second image 601B include four twin pixels 604W-Z, and the twin pixels 604 in the third image 601C include four twin pixels 604W-Z. In this example, each twin pixel 604 has two corresponding twin pixels—a respective one in each of the other two training images. Thus, twin pixels 604W correspond to each other, twin pixels 604X correspond to each other, twin pixels 604Y correspond to each other, and twin pixels 604Z correspond to each other. Each of the corresponding twin pixels 604 are twin pixels to their respective target pixels 602A-C.

For each of the target pixels 602A-C, four respective twin-pixel differences ($D_{.W}$, $D_{.X}$, $D_{.Y}$, and $D_{.Z}$) are calculated—a respective difference for each of the target pixel's respective twin pixels 604. The median and the MAD of the twin-pixel differences between the values of the corresponding target pixels 602A-C and the values of their respective twin pixels 604 are then calculated. The median and the MAD may be the median and the MAD of the differences between the values of corresponding target pixels and one twin pixel per target pixel where all of the twin pixels are corresponding twin pixels. For example, in some embodiments, the median of the twin-pixel differences $\{D_{AX}, D_{BX},$ and $D_{CX}\}$ between the target pixels 602A-C and corresponding twin pixels 604X is calculated, and the MAD of the twin-pixel differences $\{D_{AX}, D_{BX},$ and $D_{CX}\}$ between the target pixels 602A-C and corresponding twin pixels 602X is calculated. Also for example, in some embodiments, the median of the twin-pixel differences $\{D_{AY}, D_{BY},$ and $D_{CY}\}$ between the target pixels 602A-C and corresponding twin pixels 604Y is calculated, and the MAD of the twin-pixel differences $\{D_{AY}, D_{BY},$ and $D_{CY}\}$ between the target pixels 602A-C and corresponding twin pixels 604Y is calculated. Thus, for the example in FIG. 6, such embodiments calculate four medians and four MADs of twin-pixel differences, and each of the four medians and the four MADS of the twin-pixel differences is calculated based on three respective twin-pixel differences.

Also, the median and the MAD may be the median and the MAD of the differences between the values of corresponding target pixels and all of their respective twin pixels. For example, in some embodiments, the median of the twin-pixel differences $\{D_{AW}, D_{AX}, D_{AY}, D_{AZ}, D_{BW}, D_{BX}, D_{BY}, D_{BZ}, D_{CW}, D_{CX}, D_{CY},$ and $D_{CZ}\}$ between the target pixels 502A-C and each of their twin pixels 504 is calculated, and the MAD of the twin-pixel differences $\{D_{AW}, D_{AX}, D_{AY},$ $D_{AZ}, D_{BW}, D_{BX}, D_{BY}, D_{BZ}, D_{CW}, D_{CX}, D_{CY},$ and $D_{CZ}$} between the target pixels 602A-C and each of their twin pixels 604 is calculated.

Next, in block B425, the anomaly-detection device generates an anomaly-detection model based on the medians and the MADs of the twin-pixel differences. In some embodiments, an anomaly-detection model includes one or more maps. For example, if each pixel is a target pixel that has five twin pixels, then some embodiments will include ten maps: five maps will show median values for each twin pixel, and five maps will show the MAD values for each twin pixel. Also, the maps may be arranged in the form of an image, so that the position of a value in a map corresponds to the position of the target pixel in the image. Some embodiments use means and standard deviations or use medians and interquartile ranges (IQR) instead of, or in addition to, medians and MAD values. Some embodiments use other combinations of measures of centrality/normalcy and variation.

The flow then ends in block B430.

FIG. 7 illustrates an example embodiment of an operational flow for twin-pixel selection. The flow starts in block B700 and then moves to block B705, where the anomaly-detection device obtains a target pixel in a set (e.g., stack) of training images. Next, in block B710, the anomaly-detection device obtains a twin-pixel scale, which indicates the distance between the target pixel and each of the target pixel's twin pixels.

Figure 8:
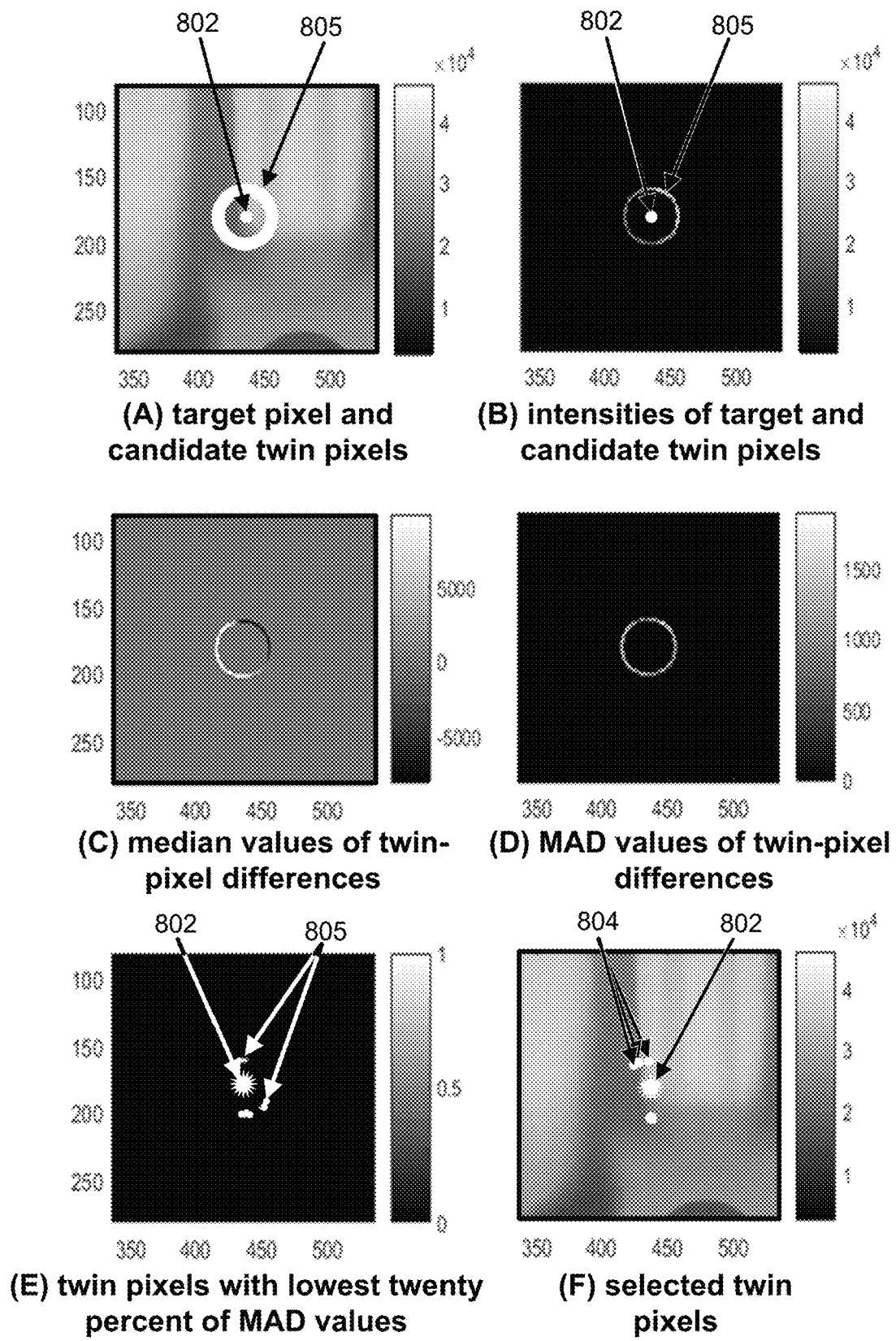
FIG. 8 illustrates example embodiments of a target pixel and candidate twin pixels.

The flow proceeds to block B715, where the anomaly-detection device selects candidate twin pixels of the target pixel based on the twin-pixel scale, for example as shown in FIG. 8. FIG. 8 illustrates example embodiments of a target pixel 802 and candidate twin pixels 805, as indicated in (A). The twin-pixel scale in this embodiment is 20 pixels—accordingly, the respective distance between the target pixel 802 and each candidate twin pixel 805 is 20 pixels. In (B), to emphasize the twin pixels 805, the intensities of all pixels that are not the target pixel 802 or one of the candidate twin pixels 805 are shown in black.

Referring again to FIG. 7, the flow then moves to block B720, where the anomaly-detection device calculates the twin-pixel differences between the target pixel and the candidate twin pixels. These operations are also performed for the corresponding target pixels of the target pixel in each of the training images in the set of training images. Thus, for each of the corresponding target pixels, the twin-pixel differences between the corresponding target pixel and the corresponding target pixel's respective candidate twin pixels are calculated.

Next, in block B725, the anomaly-detection device calculates the median and the MAD of the twin-pixel differences for the target pixel and its corresponding target pixels. For example, in FIG. 8, (C) shows the median values of the twin-pixel differences, and (D) shows the MAD values of the twin-pixel differences. The MAD values may indicate how stable or unstable the relationships are between the target pixel and the candidate twin-pixels.

The flow then moves to block B730, where the anomaly-detection device selects the candidate twin pixels that have MAD values that are below a threshold (e.g., a percentile). In FIG. 8, (E) shows the candidate twin pixels 805 that have the lowest twenty percent of MAD values. Higher MAD values may indicate unstable relationships. Some embodiments also include block B835, where the anomaly-detection device selects the "most-reliable" twin pixels, for example by sorting the twin pixels according to MAD values and then selecting the twin pixels that have the lowest MAD values. In FIG. 8, (F) shows the target pixel 802 and the selected twin pixels 804, which are the "most-reliable" twin pixels in this example. Although blocks B730 and B735 may generate good results, as an alternative to one or both of blocks B730 and B735, some embodiments select twin pixels either randomly or evenly spaced (e.g., evenly spaced from a designated area or evenly spaced in angle and at an approximate radius around a designated point, such as the target pixel location), for example to increase computation speed.

The flow then proceeds to block B740, where the anomaly-detection device determines whether to use another twin-pixel scale to select more twin pixels. If the anomaly-detection device determines to use another twin-pixel scale (block B740=Yes), then the flow moves to block B745, where the anomaly-detection device selects another twin-pixel scale, and the flow returns to block B715. Otherwise (block B740=No) the flow ends in block B750.

Figure 9:
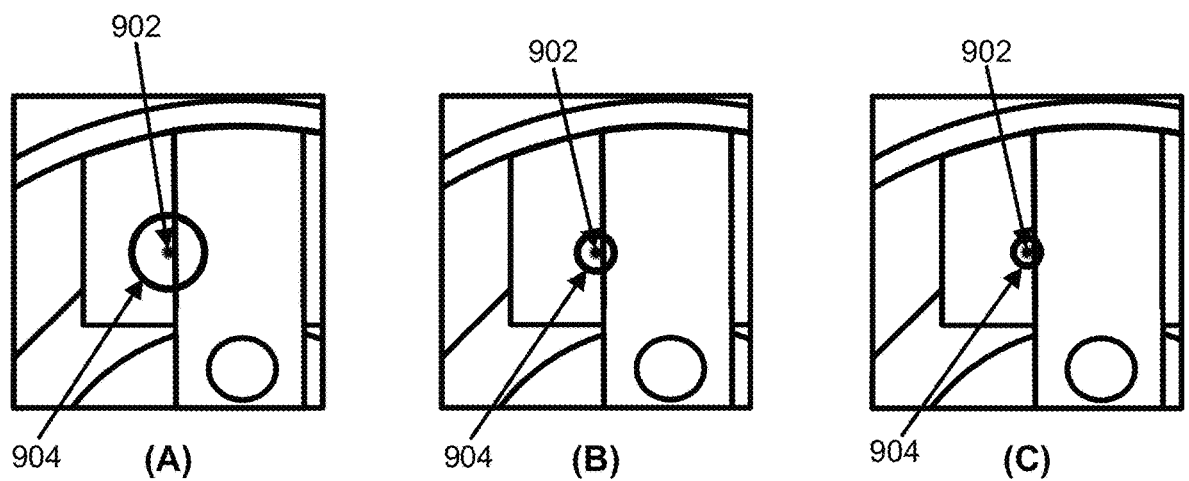
FIG. 9 illustrates an example embodiment of multi-scale twin pixels.

Accordingly, some embodiments of the anomaly-detection device select multi-scale twin-pixels. FIG. 9 illustrates an example embodiment of multi-scale twin pixels. In FIG. 9, three twin-pixel scales are used when selecting the twin pixels 904 of a target pixel 902, where (A), (B) and (C) have three different radii (e.g., 20 pixels, 10 pixels, 5 pixels). Accordingly, in some embodiments that use multi-scale twin-pixel MAD scores to detect anomalies, the output of anomaly detection is a combination of the anomaly detection in each scale. Also, some embodiments generate multiple MAD scores for each pixel.

Figure 10:
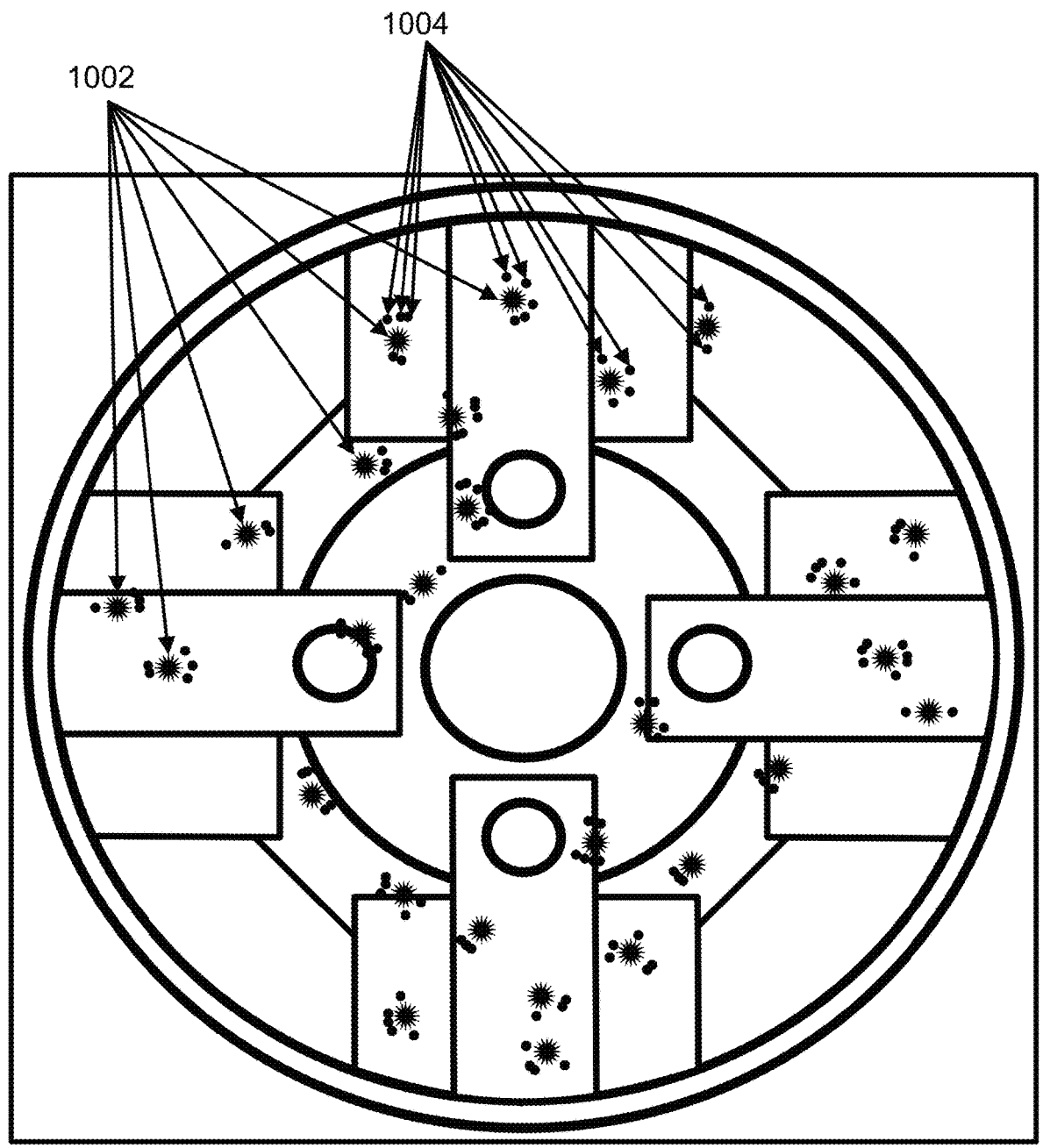
FIG. 10 illustrates example embodiments of target pixels and respective twin pixels.

And FIG. 10 illustrates example embodiments of target pixels and respective selected twin pixels. FIG. 10 shows target pixels 1002 (shown as the star-shaped markers) and their respective twin pixels 1004.

Therefore, some embodiments of the anomaly-detection device that use the twin-pixel differences (e.g., twin-pixel MAD scores) for anomaly detection use the target pixel's value differences with associated pixels (twin pixels) in the target pixel's neighborhood of the same image, rather than the target pixel's value alone, as a basic measure (e.g., difference measure) to compare the image with training images. One advantage of not directly using the pixel values as the basic measure for comparison is the elimination of the need to match the pixel-value distribution of the training images, which could introduce some extra systematic bias because the amount of pixel-value variations across the images that are generated during their image capture may not be known.

Thus, some embodiments of the anomaly-detection device use the pixel-value differences in the neighborhood within the same image as a basic measure for anomaly detection. This may eliminate much of the pixel-value adjustments (e.g., intensity adjustment) because, if there are some external variations (e.g., variations in the image-capturing system) that influence a target pixel's value, the variations may also influence the pixel values in the target pixel's neighborhood.

In addition, using the pixel-value differences in the target pixel's neighborhood as measures may also decrease the importance of image alignment. If a target pixel is not aligned well with its corresponding pixels from the training images (e.g., such that the target pixel and its corresponding pixels do not show the same location on an object) and has some x and y shifts, the pixels in the target pixel's neighborhood may also have the same x and y shifts, thus compensating to some extent for the misalignments.

FIG. 11 illustrates an example embodiment of an operational flow for generating an anomaly-detection model. The operational flow starts in block B1100 and then proceeds to block B1105, where an anomaly-detection device obtains one or more training images (e.g., images of a defect-free object). Next, in block B1110, the anomaly-detection device preprocesses the one or more training images. Also, if the training images have not already been aligned, then the anomaly-detection device aligns the training images, for example by selecting a reference image and aligning all other training images to the reference image. For example, in FIG. 12, the value of a pixel y can be predicted based on the values of neighborhood pixels $\{x_1, x_2, \ldots, x_8\}$. The accuracy of the prediction may be enhanced by observing the same pixel (the pixel at the same position) and same neighborhood pixels across multiple images of the same object. Thus, the multiple images can be aligned so that the pixel y is in the same position in each image. Accordingly, for a given aligned pixel position ij and image k, the value of the pixel (e.g., target pixel) may be denoted by the following:

$$y_{i,j,k}.$$

The flow then moves to block B1115.

Figure 12:
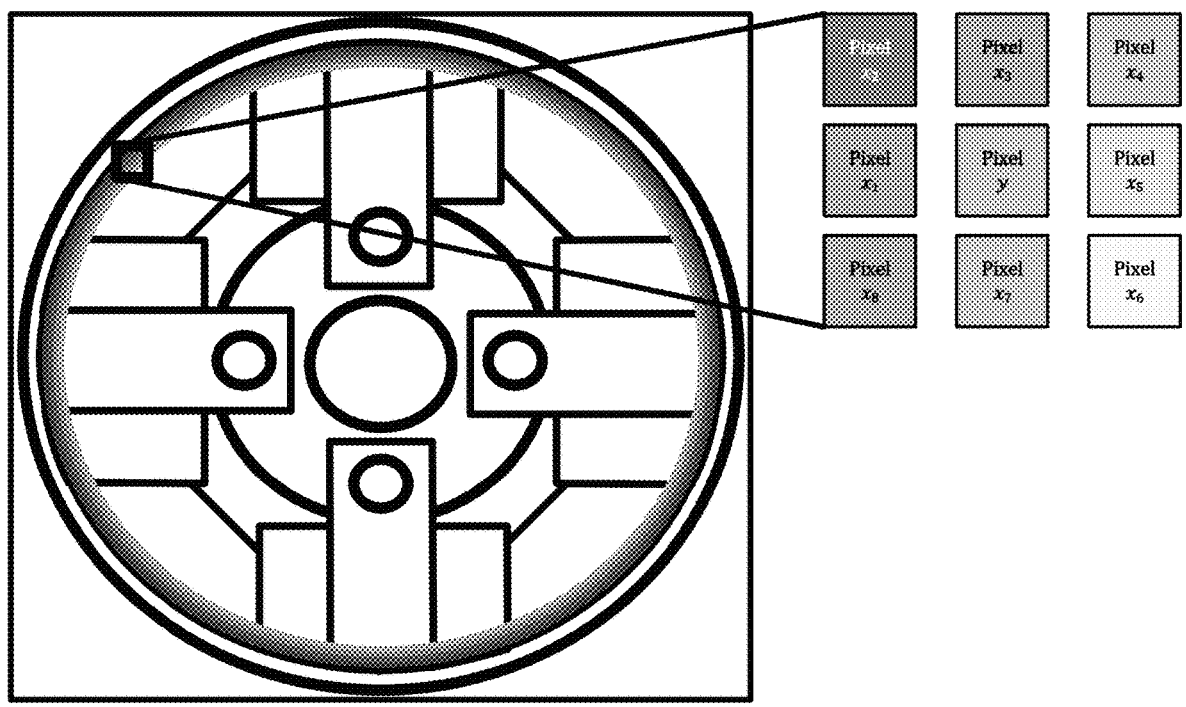
FIG. 12 illustrates an example embodiment of a target pixel and the target pixel's neighborhood.

In block B1115, the anomaly-detection device selects respective neighborhoods for one or more target pixels. A neighborhood includes one or more pixels. For example, FIG. 12 illustrates an example embodiment of a target pixel y and the target pixel's neighborhood pixels $(x_1, x_2, x_3, x_4, x_5, x_6, x_7, x_8)$, which are twin pixels to the target pixel y. The pixels in the neighborhood may be arbitrarily selected, and the number of pixels in the neighborhood may be only one.

Also for example, the neighborhood of pixel ij may be described as a set N of offsets from position ij such that the reference neighborhood pixels are defined as a vector of neighborhood pixels in the image whose offsets from position ij are in the neighborhood reference set:

$$\bar{x}_{i,j,k} = \{x_{n,m,k} : (n-i, m-j) \in N\}. \tag{1}$$

For example, the reference neighborhood pixels $\bar{x}_{i,j,k}$ could be all the pixels in an annulus bounded by two radii, $r_1$ and $r_2$:

$$\bar{x}_{i,j,k}\{x_{n,m,k} : r_1^2 \leq (n-i)^2 + (m-j)^2 \leq r_2^2\}. \tag{2}$$

The neighborhoods of the reference pixels can be defined at different scales and distances from the target pixel. In some embodiments, an annulus around the pixel is used as a reference neighborhood. The radius of the annulus can be varied to perform anomaly detection at one or more scales. Small radii may be good for detecting small single-pixel anomalies, while larger radii may be appropriate for larger-scale anomalies. In image regions where the reference neighborhood extends outside of the image or the region of interest of an image, the neighborhood may be truncated to those neighbors that are in a valid region.

Next, in block B1120, the anomaly-detection device generates a respective predictive model for each target pixel based on the target pixel's respective neighborhood. In some embodiments, the anomaly-detection device can use the predictive model to predict the value (e.g., intensity value) of a given pixel at a given position (e.g., a target pixel) based on the values of the pixels in the pixel's neighborhood.

The predictive model may be described as a regression problem. For example, in some embodiments, the regression model is linear, and $\hat{y}_{i,j,k}$ can be described by the following:

$$\hat{y}_{i,j,k} = a^T \bar{x}_{i,j,k} + b, \tag{3}$$

where $\hat{y}_{i,j,k}$ is the predicted value of a pixel (e.g., a target pixel).

When this model is repeatedly constructed for multiple target pixels (e.g., each target pixel), the pixel-position subscripts can be removed and the expression can be simplified to $$\hat{y}_k = a^T \bar{x}_k + b \tag{4}$$

The coefficients a and b can be solved by minimizing an objective function, for example as described by the following:

$$\min_{a,b} \sum_{k \in normal} (y_k - a^T \bar{x}_k - b)^2 + \lambda(a^T a + b^2), \tag{5}$$

where $\lambda(a^T a + b^2)$ is a regularization term that prevents the regression from overfitting. This may be especially advantageous when the number of neighborhood pixels is large relative to the number of training image (e.g., training images). Also, the summation for a target pixel is performed over all the images in a group of images that show an object that is not anomalous (e.g., non-defective) in the target pixel's position and in the reference neighborhood of the pixel. This eliminates any contribution from defect regions or anomalies.

Sometimes, at least some of the normal and abnormal images are not labeled, and some embodiments of the anomaly-detection device perform operations to exclude outliers in the regression calculation. For example, some embodiments of the anomaly-detection device minimize a median squared error instead of the sum. Also for example, some embodiments of the anomaly-detection device perform the regression in a first pass, and images that produce large errors (outlier predictions) are excluded in a second pass as if the outlier cases are assumed to not be normal. And in some embodiments of the anomaly-detection device, algorithms (e.g., RANSAC) are used to perform regression that is more robust to outliers in the training data.

Additionally, in some embodiments, the regression offset parameter b is not included in the regularization term. And in some embodiments, the regularization term $\lambda(a^T a + b^2)$ has another form, for example those using $L_0$, $L_1$, $L_2$ norm regularization. Some embodiments use Lasso regression in lieu of ridge regression to perform the optimization operations.

In embodiments where the number of training images is larger than the number of model parameters, the regularization term may not be used or the parameter $\lambda$ can become arbitrarily small (e.g., zero).

Equation (5) can be modified by augmenting the vector $\bar{x}_k$ to include a constant term of 1. Then the coefficient b can be captured in the augmented parameter vector a, for example as follows:

$$\min_{\tilde{a}} \sum_{k \in normal} (y_k - \tilde{a}^T \tilde{x}_k)^2 + \lambda(\tilde{a}^T \tilde{a}). \tag{6}$$

This can be also be described in vector and matrix form where $y = [y_1\ y_2\ y_3\ \ldots]$ and $X = [\tilde{x}_1\ \tilde{x}_2\ \tilde{x}_3\ \ldots]^T$. The objective function can accordingly be described as follows:

$$\min_{\tilde{a}} (y - X\tilde{a})^T (y - X\tilde{a}) + \lambda \tilde{a}^T \tilde{a}. \tag{7}$$

A solution that minimizes this objective function is the regularized pseudo inverse:

$$\tilde{a}=(X^TX+\lambda I)^{-1}X^Ty. \quad (8)$$

In this regularized solution, the data is normalized so that the same regularization parameter applies across the entire set of image pixels. Alternatively, the regularization parameter could scale according to local variations in the reference neighborhood.

While the above-described embodiments implement linear regression, some embodiments of the anomaly-detection device implement non-linear regression, such as polynomial regression or regression neural networks with non-linear neuron activations.

Furthermore, some embodiments of the anomaly-detection device perform pixel-value prediction using not only a weighted sum of the reference neighbors, but also by adding weighted sums of reference neighbors of filtered versions of the images. In these embodiments, the vector x̃ may include the neighborhood pixels of the original image and the neighborhood pixels of the filtered images. For example, a filtered image may have been filtered with a horizontal direction gradient and a vertical direction gradient. These two gradient images (the filtered original images), along with the original image, can be used to construct the vector x by adding the original image reference neighborhood pixels, the horizontal gradient image reference neighborhood pixels, and the vertical gradient image reference neighborhood pixels. Moreover, some embodiments of the anomaly-detection device use other linear and non-linear image filters to enhance the reference neighborhood vector. Regularization hyper-parameters may also be adjusted for each type of regressor input (e.g., each filter may have its own regularization hyper-parameter).

Due to pixel-value variations (e.g., intensity variations) across images and modeling sensitivity to pixel-value variations, as well as potential biases in predictions based on the regularization, some embodiments apply an additional correction term on the prediction based on a predicted value of y. For example, some embodiments of the anomaly-detection device implement a parametric model of the prediction error that can be described by the following:

$$f(\hat{y};\theta)\approx y-\hat{y} \quad (9)$$

The parametric model f, having parameters θ, may be linear, and the parametric model f may be non-linear (e.g., a polynomial). The parameters for the prediction error model may be solved and the prediction 9 may be adjusted to y̌=ŷ+f(ŷ; θ). In some circumstances, this may provide a better prediction.

After block B1120, the flow moves to block B1125, where the anomaly-detection device generates an anomaly-detection model based on the predictive models. For example, the anomaly-detection model may include the respective predictive model of each target pixel. The flow then ends in block B1130.

In some embodiments, the anomaly-detection model includes a set of regression parameters for each pixel position in an object image. Additional prediction correction terms may be stored for the whole image or per pixel. Also, a median, mean error, or standard deviation may be stored for each pixel.

For sparse regression solutions (e.g., results of Lasso regression where many regression coefficients are zero), the predictive models can be stored as sparse vectors, which may require less space for storage.

Figure 13:
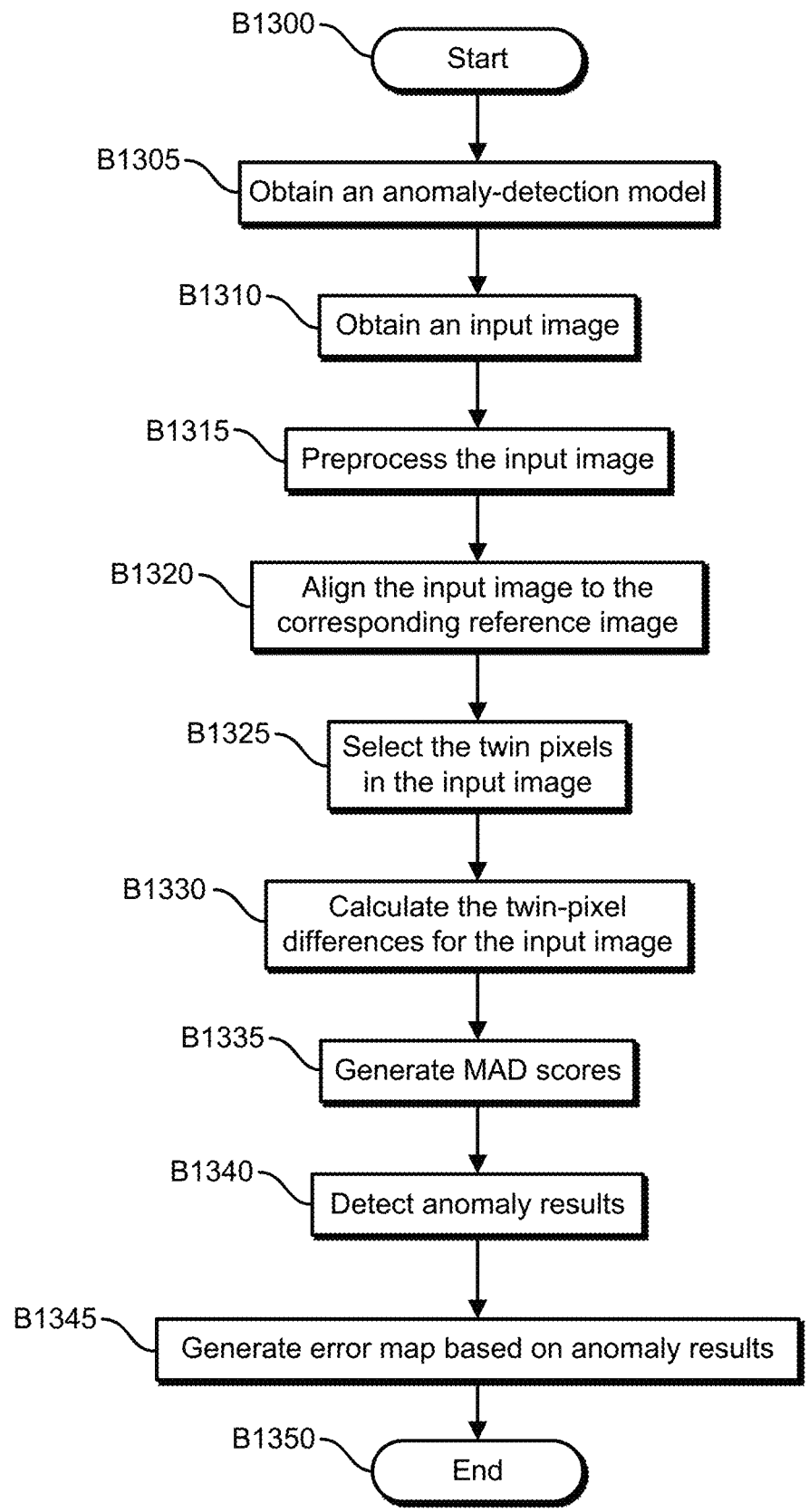
FIG. 13 illustrates an example embodiment of an operational flow for generating an error map.

FIG. 13 illustrates an example embodiment of an operational flow for generating an error map. The flow starts in block B1300 and then moves to block B1305, where an anomaly-detection device obtains an anomaly-detection model (e.g., from storage). In this embodiment, the anomaly-detection model includes one or more maps that include each (target) pixel's twin pixels and include the mean and MAD values for each of the twin pixels.

The flow moves to block B1310, where the anomaly-detection device obtains an input image (e.g., a test image). Next, in block B1315, the anomaly-detection device preprocesses the input image. The flow then proceeds to block B1320, where the anomaly-detection device aligns the input image with the corresponding reference image of the anomaly-detection model.

Next, in block B1325, the anomaly-detection device selects, for each target pixel in the input image, the twin pixels that are identified by the anomaly-detection model. In some embodiments, the anomaly-detection device uses each pixel in the image as a target pixel for which twin pixels are selected. The flow proceeds to block B1330, where the anomaly-detection device calculates the twin-pixel differences for the target pixels and their respective twin pixels in the input image.

Then, in block B1335, the anomaly-detection device generates at least one respective twin-pixel MAD score for one or more target pixels (e.g., each pixel) in the input image. For example, in some embodiments, the twin-pixel MAD scores for a target pixel are based on that target pixel's respective twin-pixel differences from block B1330 and on that target pixel's corresponding median and MAD from the anomaly-detection model.

Also for example, the calculation of a twin-pixel MAD score by some embodiments of the anomaly-detection device can be described by equation (10):

$$Score_{TPMAD} = \frac{Diff_{Tp} - \text{Median\_diff}_{set}}{\text{MAD\_diff}_{set}}, \quad (10)$$

where $Score_{TPMAD}$ is the twin-pixel MAD score of one twin pixel for a target pixel in the input image, $Diff_{Tp}$ is the difference between the value of the target pixel and the value of the one twin pixel in the input image, and Median_diff$_{set}$ and MAD_diff$_{set}$ are the median and MAD of the difference from the anomaly-detection model. In some embodiments, the $Score_{TPMAD}$ is defined as the absolute value of the score given by equation (10).

The flow then proceeds to block B1340, where the anomaly-detection device detects which pixels, if any, in the input image have an anomaly based on the twin-pixel MAD scores. For example, depending on the number of twin pixels selected, some embodiments may have multiple twin-pixel MAD scores from multiple twin pixels for the same target pixel. Thus, some embodiments of the anomaly-detection device use a strategy based on majority voting or arithmetic mean to determine if a pixel is an anomaly or not. Also, some embodiments use two-level thresholding to detect the pixels that have anomalies. And some embodiments base the anomaly detection on the twin-pixel differences without generating MAD scores or medians of the twin-pixel differences. For example, some embodiments use a threshold on a sum of the respective twin-pixel differences of a target pixel to detect an anomaly at that target pixel.

In block B1345, the anomaly-detection device generates an error map based on the anomaly results. Also, some embodiments omit block B1340 and generate an error map based on the MAD scores. Then the flow ends in block B1350.

Figure 14:
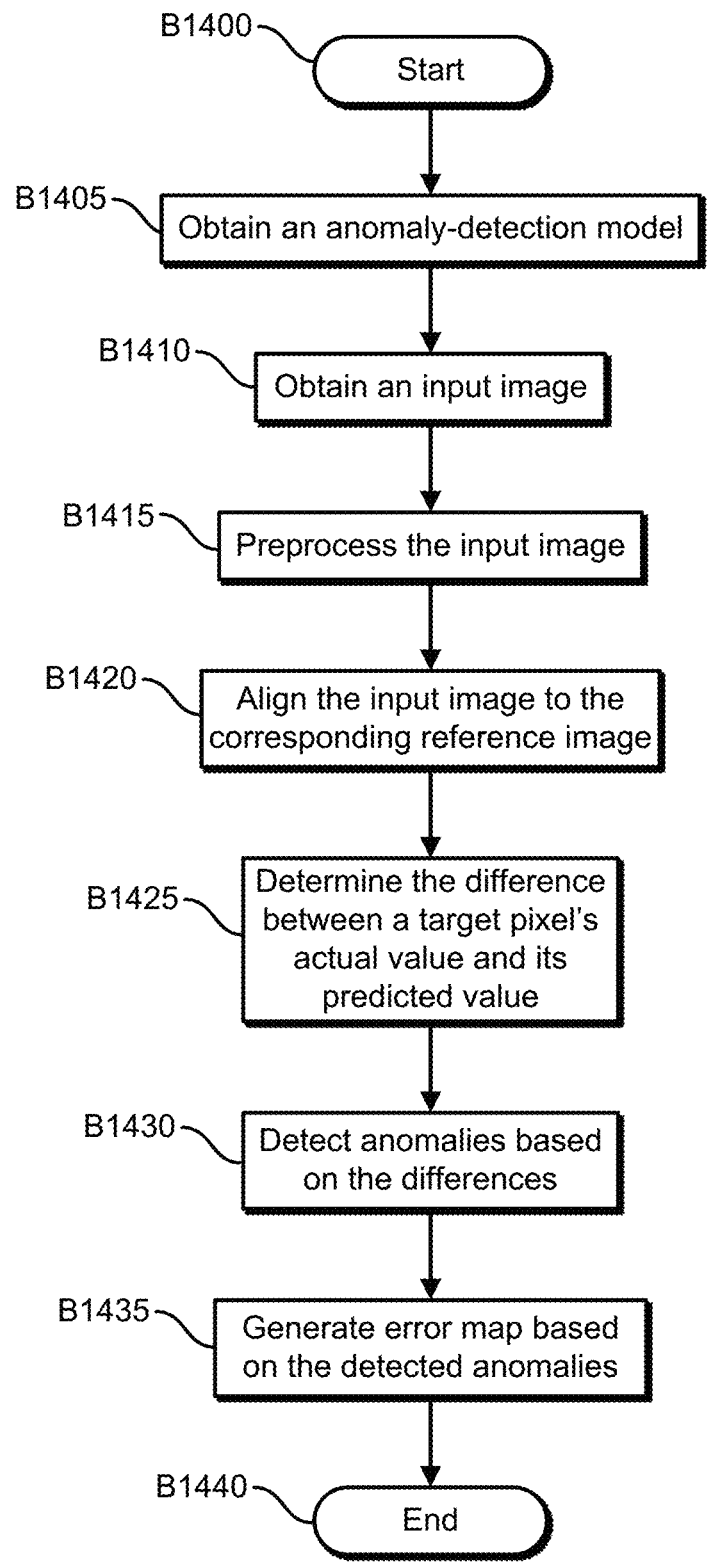
FIG. 14 illustrates an example embodiment of an operational flow for generating an error map.

FIG. 14 illustrates an example embodiment of an operational flow for generating an error map. The flow starts in block B1400 and then moves to block B1405, where an anomaly-detection device obtains an anomaly-detection model (e.g., from storage). In this embodiment, the anomaly-detection model includes one or more respective predictive models for each target pixel.

Next, in block B1410, the anomaly-detection device obtains an input image (e.g., a test image). Then, in block B1415, the anomaly-detection device preprocesses the input image. The flow then proceeds to block B1420, where the anomaly-detection device aligns the input image with the corresponding reference image of the anomaly-detection model.

Next, in block B1425, for each target pixel of interest, the anomaly-detection device determines the difference between the target pixel's actual value and its predicted value. The predicted value is generated using at least one of the predictive models that are included in the obtained anomaly-detection model and on one or more of the values of the pixels that are in the neighborhood of the target pixel (the predictive models may accept the values of the pixels that are in the neighborhood as inputs). For example, in some embodiments the difference e may be described by the following:

$$e = y - \breve{y}, \quad (11)$$

where y is the target pixel's actual value and $\breve{y}$ is the predicted value.

Then, in block B1430, the anomaly-detection device detects anomalies based on the differences e. For example, the anomaly-detection device can compare the prediction error e to the median or mean prediction error for a set of example images (e.g., the images used to generate the predictive model). Additionally, the difference from the mean or median can be scaled according to the natural variation of this difference e across a set of training images. Thus, some embodiments of the anomaly-detection device generate a respective anomaly score s for each pixel of interest (e.g., target pixel) that can be described by $$s = \left| \frac{e - \mu_e}{\sigma_e} \right|, \quad (12)$$

where $\mu_e$ is the mean or median prediction error observed, and where $\sigma_e$ is an estimate of the standard deviation of the prediction error. $\sigma_e$ may be the actual standard deviation or may be derived using other methods, such as Median of Absolute Deviations (MAD) or inter-quartile ranges (IQR), for example.

In block B1435, the anomaly-detection device generates an error map based on the anomaly results. Also, some embodiments omit block B1430 and generate the error map based on the differences. Then the flow ends in block B1440.

Figure 15:
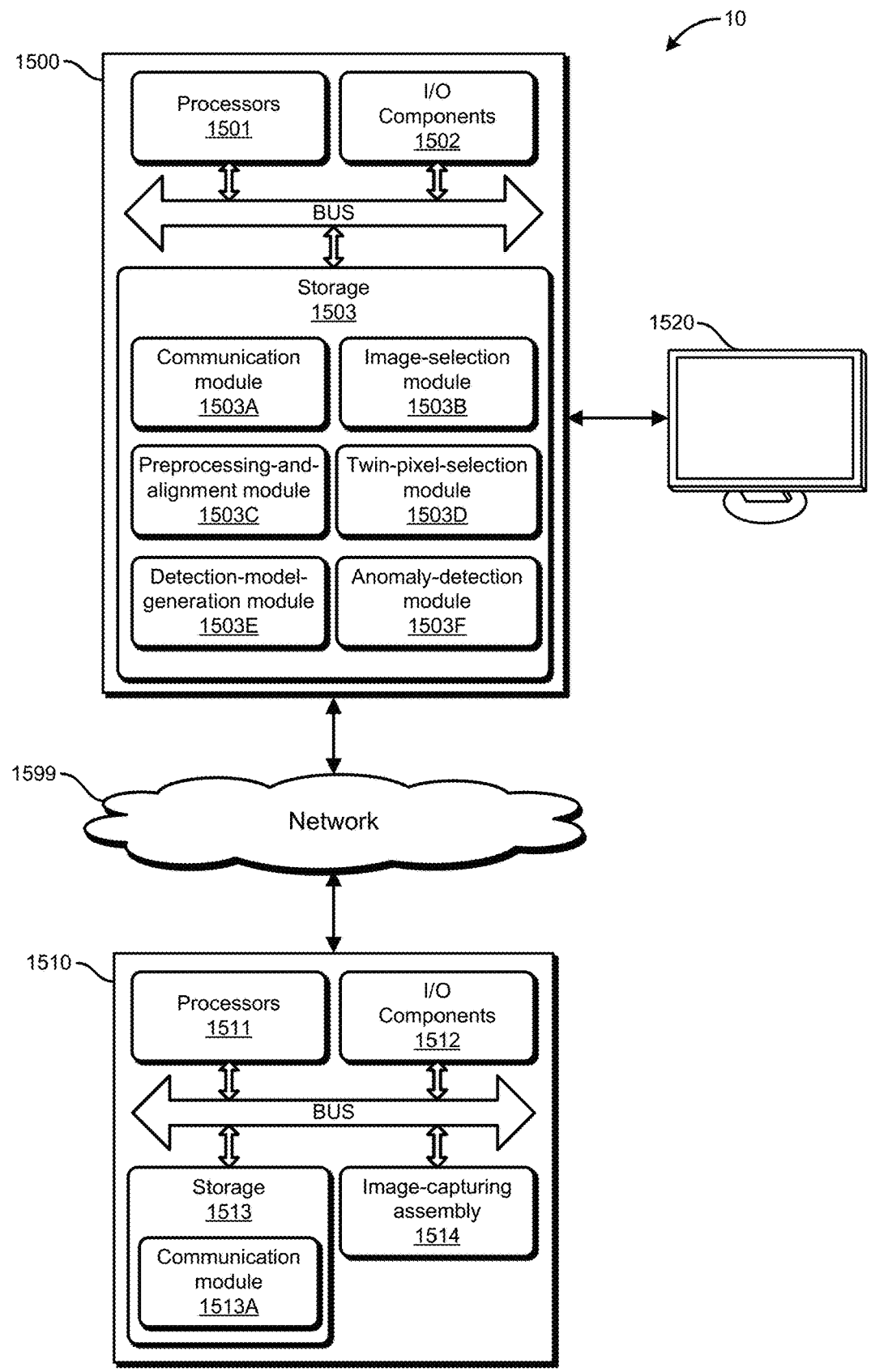
FIG. 15 illustrates an example embodiment of an anomaly-detection system.

FIG. 15 illustrates an example embodiment of an anomaly-detection system. The system 10 includes an anomaly-detection device 1500, which is a specially-configured computing device; an image-capturing device 1510; and a display device 1520. In this embodiment, the anomaly-detection device 1500 and the image-capturing device 1510 communicate via one or more networks 1599, which may include a wired network, a wireless network, a LAN, a WAN, a MAN, and a PAN. Also, in some embodiments of the system 10, the devices communicate via other wired or wireless channels.

The anomaly-detection device 1500 includes one or more processors 1501, one or more I/O components 1502, and storage 1503. Also, the hardware components of the anomaly-detection device 1500 communicate via one or more buses or other electrical connections. Examples of buses include a universal serial bus (USB), an IEEE 1394 bus, a Peripheral Component Interconnect (PCI) bus, a Peripheral Component Interconnect Express (PCIe) bus, an Accelerated Graphics Port (AGP) bus, a Serial AT Attachment (SATA) bus, and a Small Computer System Interface (SCSI) bus.

The one or more processors 1501 include one or more central processing units (CPUs), which may include microprocessors (e.g., a single core microprocessor, a multi-core microprocessor); one or more graphics processing units (GPUs); one or more tensor processing units (TPUs); one or more application-specific integrated circuits (ASICs); one or more field-programmable-gate arrays (FPGAs); one or more digital signal processors (DSPs); or other electronic circuitry (e.g., other integrated circuits). The I/O components 1502 include communication components (e.g., a GPU, a network-interface controller) that communicate with the display device 1520, the network 1599, the image-capturing device 1510, and other input or output devices (not illustrated), which may include a keyboard, a mouse, a printing device, a touch screen, a light pen, an optical-storage device, a scanner, a microphone, a drive, and a hand-held controller (e.g., a joystick, a control pad).

The storage 1503 includes one or more computer-readable storage media. As used herein, a computer-readable storage medium includes an article of manufacture, and examples of articles of manufacture include a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage 1503, which may include both ROM and RAM, can store computer-readable data or computer-executable instructions.

The anomaly-detection device 1500 also includes a communication module 1503A, an image-selection module 1503B, a preprocessing-and-alignment module 1503C, a twin-pixel-selection module 1503D, a detection-model-generation module 1503E, and an anomaly-detection module 1503F. A module includes logic, computer-readable data, or computer-executable instructions. In the embodiment shown in FIG. 15, the modules are implemented in software (e.g., Assembly, C, C++, C#, Java, BASIC, Perl, Visual Basic). However, in some embodiments, the modules are implemented in hardware (e.g., customized circuitry) or, alternatively, a combination of software and hardware. When the modules are implemented, at least in part, in software, then the software can be stored in the storage 1503. Also, in some embodiments, the anomaly-detection device 1500 includes additional or fewer modules, the modules are combined into fewer modules, or the modules are divided into more modules.

The communication module 1503A includes instructions that cause the anomaly-detection device 1500 to communicate with one or more other devices (e.g., the image-capturing device 1510, the display device 1520). For example, some embodiments of the communication module 1503A include instructions that cause the anomaly-detection device 1500 to perform at least some of the operations that are described in block B210 in FIG. 2, in block B306 in FIG. 3, in block B405 in FIG. 4, in block B1105 in FIG. 11, in block B1310 in FIG. 13, and in block B1410 in FIG. 14.

The image-selection module 1503B includes instructions that cause the anomaly-detection device 1500 to select one or more reference images. For example, some embodiments of the image-selection module 1503B include instructions that cause the anomaly-detection device 1500 to perform at least some of the operations that are described in block B220 in FIG. 2.

The preprocessing-and-alignment module 1503C includes instructions that cause the anomaly-detection device 1500 to perform preprocessing on one or more images and to align two or more images (e.g., by aligning the images to a reference image). For example, some embodiments of the preprocessing-and-alignment module 1503C include instructions that cause the anomaly-detection device 1500 to perform at least some of the operations that are described in blocks B220 and B230 in FIG. 2; in blocks B310, B320, and B330 in FIG. 3; in block B410 in FIG. 4; in block B1110 in FIG. 11; in blocks B1315 and B1320 in FIG. 1320; and in blocks B1415 and B1420 in FIG. 14.

The twin-pixel-selection module 1503D includes instructions that cause the anomaly-detection device 1500 to select respective twin pixels or neighborhood pixels for one or more target pixels. For example, some embodiments of the twin-pixel-selection module 1503D include instructions that cause the anomaly-detection device 1500 to perform at least some of the operations that are described in block B415 in FIG. 4, in blocks B705-B745 in FIG. 7, and in block B1115 in FIG. 11.

The detection-model-generation module 1503E includes instructions that cause the anomaly-detection device 1500 to generate one or more anomaly-detection models. For example, some embodiments of the detection-model-generation module 1503E include instructions that cause the anomaly-detection device 1500 to perform at least some of the operations that are described in blocks B240-B250 in FIG. 2, in blocks B420-B425 in FIG. 4, and in blocks B1120-B1125 in FIG. 11.

The anomaly-detection module 1503F includes instructions that cause the anomaly-detection device 1500 to obtain reference images and anomaly-detection models (e.g., from storage) and to detect anomalies in one or more input images. In some embodiments, the detection is based on the pixel values in the one or more input images, for example the twin-pixel differences in the input image (e.g., based on the MAD scores of the twin-pixel differences) or the differences between the actual values of the pixels in the input image and their predicted values. For example, some embodiments of the anomaly-detection module 1503F include instructions that cause the anomaly-detection device 1500 to perform at least some of the operations that are described in blocks B303, B313, B316, B323, B326, B333, B336, and B340 in FIG. 3; in blocks B1305 and B1325-B1345 in FIG. 13; and in blocks B1405 and B1425-B1435 in FIG. 14.

The image-capturing device 1510 includes one or more processors 1511, one or more I/O components 1512, storage 1513, a communication module 1513A, and an image-capturing assembly 1514. The image-capturing assembly 1514 includes one or more image sensors and may include one or more lenses and an aperture. The communication module 1513A includes instructions that, when executed, or circuits that, when activated, cause the image-capturing device 1510 to capture an image, receive a request for an image from a requesting device, retrieve a requested image from the storage 1513, or send an image (e.g., a requested image) to another device (e.g., the anomaly-detection device 1500).

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements.

The invention claimed is:

1. A device comprising:
one or more computer-readable storage media; and
one or more processors in communication with the one or more computer-readable storage media to cause the device to perform operations comprising:
obtaining training images;
selecting a first reference image and a second reference image from the training images;
generating a first set of aligned training images, wherein generating the first set of aligned training images includes aligning the training images to the first reference image;
generating a first anomaly-detection model based on the first set of aligned training images;
generating a second set of aligned training images, wherein generating the second set of aligned training images includes aligning the training images to the second reference image;
generating a second anomaly-detection model based on the second set of aligned training images;
obtaining a test image that is defined in a test image space;
aligning the test image to the first reference image, thereby generating a first aligned test image;
generating a first error map based on the first aligned test image and on the first anomaly-detection model;
aligning the first error map to an image space of a specified image, thereby generating a first aligned error map;
aligning the test image to the second reference image, thereby generating a second aligned test image;
generating a second error map based on the second aligned test image and on the second anomaly-detection model;
aligning the second error map to the image space of the specified image, thereby generating a second aligned error map; and
generating a composite error map based on the first aligned error map and on the second aligned error map.

2. The device of claim 1, wherein the specified image is the test image and the image space of the specified image is the test image space.

3. The device of claim 1, wherein the operations further comprise:
selecting a third reference image from the training images;
generating a third set of aligned training images, wherein generating the third set of aligned training images includes aligning the training images to the third reference image; and
generating a third anomaly-detection model based on the third set of aligned training images.

4. The device of claim 1, wherein generating the first anomaly-detection model based on the first set of aligned training images includes:
selecting, for each target pixel of a plurality of target pixels in the training images, one or more respective associated pixels of the target pixel; and
calculating, for each target pixel of the plurality of target pixels, respective differences between a value of the target pixel and one or more derived values of the associated pixels of the target pixel.

5. The device of claim 4, wherein each of the one or more derived values of the associated pixels is a value of one of the associated pixels.

6. The device of claim 4, wherein each of the one or more derived values of the associated pixels is based on a plurality of values of the associated pixels.

7. The device of claim 4, wherein generating the first anomaly-detection model based on the first set of aligned training images further includes:
calculating, for each target pixel of the plurality of target pixels, one or both of:
a centrality of the respective differences between the value of the target pixel and the one or more derived values of the associated pixels of the target pixel, and
a deviation of the respective differences between the value of the target pixel and the one or more derived values of the associated pixels of the target pixel.

8. A method comprising:
obtaining training images;
selecting a first reference image and a second reference image from the training images;
generating a first set of aligned training images, wherein generating the first set of aligned training images includes aligning the training images to the first reference image;
generating a first anomaly-detection model based on the first set of aligned training images;
generating a second set of aligned training images, wherein generating the second set of aligned training images includes aligning the training images to the second reference image;
generating a second anomaly-detection model based on the second set of aligned training images;
obtaining a test image that is defined in a test image space;
aligning the test image to the first reference image, thereby generating a first aligned test image;
generating a first error map based on the first aligned test image and on the first anomaly-detection model;
aligning the first error map to an image space of a specified image, thereby generating a first aligned error map;
aligning the test image to the second reference image, thereby generating a second aligned test image;
generating a second error map based on the second aligned test image and on the second anomaly-detection model;
aligning the second error map to the image space of the specified image, thereby generating a second aligned error map; and
generating a composite error map based on the first aligned error map and on the second aligned error map.

9. The method of claim 8, wherein the specified image is the test image and the image space of the specified image is the test image space.

10. The method of claim 8, wherein aligning the first error map to the image space of the specified image includes warping the first error map, and
wherein aligning the second error map to the image space of the specified image includes warping the second error map.

11. The method of claim 8, wherein generating the first anomaly-detection model based on the first set of aligned training images includes:
selecting, for each target pixel of a plurality of target pixels in the training images, one or more respective associated pixels of the target pixel; and
calculating, for each target pixel of the plurality of target pixels, respective differences between a value of the target pixel and one or more derived values of the associated pixels of the target pixel.

12. The method of claim 11, wherein each of the one or more derived values of the associated pixels is a value of one of the associated pixels.

13. The method of claim 11, wherein each of the one or more derived values of the associated pixels is based on a plurality of values of the associated pixels.

14. The method of claim 11, wherein generating the first anomaly-detection model based on the first set of aligned training images further includes:
calculating, for each target pixel of the plurality of target pixels, one or both of:
a centrality of the respective differences between the value of the target pixel and the one or more derived values of the associated pixels of the target pixel, and
a deviation of the respective differences between the value of the target pixel and the one or more derived values of the associated pixels of the target pixel.

15. One or more non-transitory computer-readable storage media storing instructions that, when executed by one or more computing devices, cause the one or more computing devices to perform operations comprising:
obtaining training images;
selecting a first reference image and a second reference image from the training images;
generating a first set of aligned training images, wherein generating the first set of aligned training images includes aligning the training images to the first reference image;
generating a first anomaly-detection model based on the first set of aligned training images;
generating a second set of aligned training images, wherein generating the second set of aligned training images includes aligning the training images to the second reference image;
generating a second anomaly-detection model based on the second set of aligned training images;
obtaining a test image that is defined in a test image space;
aligning the test image to the first reference image, thereby generating a first aligned test image;

generating a first error map based on the first aligned test image and on the first anomaly-detection model;

aligning the first error map to an image space of a specified image, thereby generating a first aligned error map;

aligning the test image to the second reference image, thereby generating a second aligned test image;

generating a second error map based on the second aligned test image and on the second anomaly-detection model;

aligning the second error map to the image space of the specified image, thereby generating a second aligned error map; and generating a composite error map based on the first aligned error map and on the second aligned error map.

16. The one or more non-transitory computer-readable media of claim 15, wherein the specified image is the test image and the image space of the specified image is the test image space.

17. The one or more non-transitory computer-readable media of claim 15, wherein generating the composite error map based on the first aligned error map and on the second aligned error map includes quantizing values in the first aligned error map and values in the second aligned error map.

18. The one or more non-transitory computer-readable media of claim 15, wherein generating the first anomaly-detection model based on the first set of aligned training images includes:

selecting, for each target pixel of a plurality of target pixels in the training images, one or more respective associated pixels of the target pixel; and calculating, for each target pixel of the plurality of target pixels, respective differences between a value of the target pixel and one or more derived values of the associated pixels of the target pixel.

19. The one or more non-transitory computer-readable media of claim 18, wherein each of the one or more derived values of the associated pixels is a value of one of the associated pixels.

20. The one or more non-transitory computer-readable media of claim 18, wherein each of the one or more derived values of the associated pixels is based on a plurality of values of the associated pixels.

* * * * *